Patented Apr. 22, 1930

1,755,189

UNITED STATES PATENT OFFICE

WILHELM PUNGS, OF LUDWIGSHAFEN-ON-THE-RHINE, AND MICHAEL JAHRSTORFER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF VALUABLE PRODUCTS FROM MONTAN WAX

No Drawing. Application filed September 10, 1927, Serial No. 218,854, and in Germany September 13, 1926.

Crude Montan wax consists, mainly, in addition to resin acids, fatty acids and the like, of valuable wax esters similar to those contained in carnauba wax in which the said wax esters usually consist of a mixture of esters of acids of high molecular weight containing from 26 to 29 carbon atoms, with alcohols of the type of triacontyl alcohol ($C_{30}H_{61}OH$) and the like. In the refining processes which are usually employed, such as distillation, or bleaching with cromic acid in aqueous sulfuric acid, the valuable wax is extensively decomposed to acids, and even in the case of Montan wax which has been bleached in a protective manner as for example according to the German Patent No. 409,420, acids similar to those contained in the crude wax are found and impair the good properties of the wax.

We have now found that the valuable wax esters may be separated from the said acids in a simple manner by treating Montan wax with hot concentrated acetic acid. According to this method of working the valuable unsaponified wax may be separated from the other constituents such as resin acids, fatty acids, and the like, both in the case of the crude wax and of the wax which has been freed from resins, or has been more or less extensively saponified, as for example by bleaching with chromic acid in aqueous sulfuric acid solution, or has been pre-treated in any other way.

A wax of excellent properties may be obtained by applying the treatment with concentrated acetic acid to Montan wax which has been bleached with chromic acid in the presence of glacial acetic acid with or without an addition of small quantities of sulfuric acid.

The following examples will further illustrate how the said invention may be carried out in practice but the invention is not limited thereto.

Example 1

Crude Montan wax is extracted with glacial acetic acid in a Soxhlet apparatus, by which means the insoluble portion becomes enriched in wax esters, and impoverished in acids and pigmentary constituents.

Example 2

500 grams of crude, or de-resinified, Montan wax, in boiling glacial acetic acid to which from 10 to 20 cubic centimetres of concentrated sulfuric acid have been added, are bleached with a concentrated solution of about 500 grams of chromic acid, the mixture being then allowed to cool. The bleached wax separates out, above the glacial acetic acid mother liquor containing the fatty acids, as a greenish-yellow cake, which is removed. To eliminate the chromic acid salts and organic acids still contained in the wax, the latter is boiled again with glacial acetic acid, treated with a little lime, and then allowed to cool as slowly as possible. The wax then removed may be boiled again with clean water, and is only very slightly colored. By diluting the glacial acetic acid solution separated from the wax esters with water, a product is obtained which consists, for the most part, of Montanic acid.

Example 3

500 grams of crude or de-resinified Montan wax are heated to boiling with a mixture of 700 cubic centimetres of concentrated sulfuric acid and 2000 cubic centimetres of water, whereupon 700 grams of chromic acid in the state of a concentrated aqueous solution are slowly added. After prolonged stirring, the mixture is poured into hot water, and, when cold, the bleached, but strongly saponified, product is filtered off. By boiling with 5 litres of glacial acetic acid and careful cooling, the still unsaponified wax, which forms a solid cake above the glacial acetic acid solution, can be removed. After being washed with water, and melted in vacuo, the wax purified in this manner has the melting point of from 88° to 89° C.

The product (chiefly Montanic acid) which separates out in a finely divided condition from the glacial acetic acid solution on further cooling, can be filtered off by suction and after being washed, and melted in vacuo, has the melting point of from 81° to 83° C.

What we claim is:

1. The process of separating the wax esters contained in refined Montan wax which comprises boiling the said Montan wax with concentrated acetic acid.

2. The process of separating the wax esters contained in Montan wax bleached by treatment with chromic acid in the presence of glacial acetic acid and small quantities of sulfuric acid, which comprises boiling the said Montan wax with concentrated acetic acid.

In testimony whereof we have hereunto set our hands.

WILHELM PUNGS.
MICHAEL JAHRSTORFER.